May 18, 1926.

M. DE CRISTOFARO

ROTARY PLOW

Filed May 16, 1924    2 Sheets-Sheet 1

1,585,086

Michael de Cristofaro INVENTOR

Louis Prevost Whitaker BY

ATTORNEY

May 18, 1926.
M. DE CRISTOFARO
1,585,086
ROTARY PLOW
Filed May 16, 1924   2 Sheets-Sheet 2
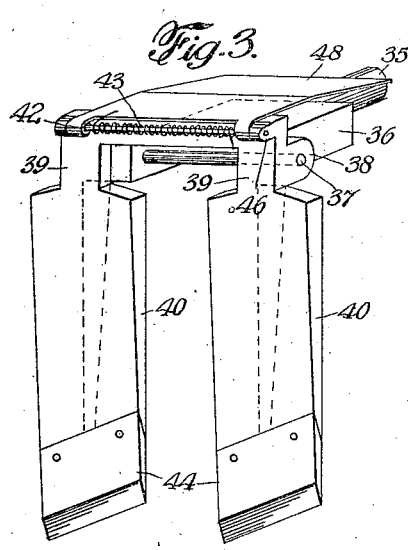
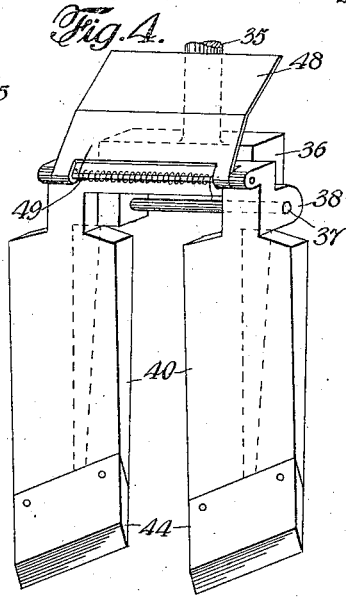
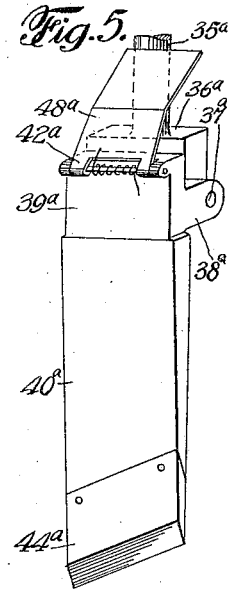
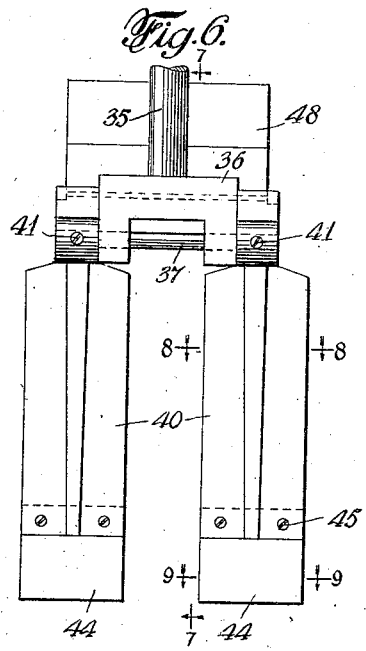
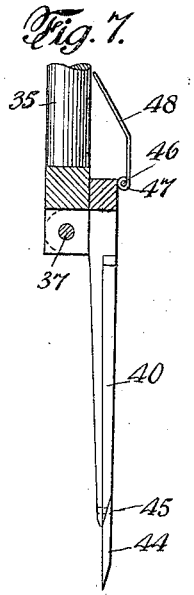
Michael de Cristofaro INVENTOR
Louis Prevost Whitaker BY
ATTORNEY Patented May 18, 1926.

1,585,086

UNITED STATES PATENT OFFICE.

MICHAEL DE CRISTOFARO, OF ASTORIA, NEW YORK.

ROTARY PLOW.

Application filed May 16, 1924. Serial No. 713,670.

My invention consists in the novel features hereinafter described, reference being had to the accompanying drawings, which illustrate one embodiment of the same selected by me for purposes of illustration, and the said invention is fully disclosed in the following description and claims.

The object of my invention is to provide a rotary plow mechanism adapted to be carried by a vehicle movable over the surface of the ground, as a tractor, for example, and adapted to be operated by power, and to this end my invention comprises certain new constructions and combinations of parts hereinafter fully described.

Referring to the accompanying drawings.

Figure 2:
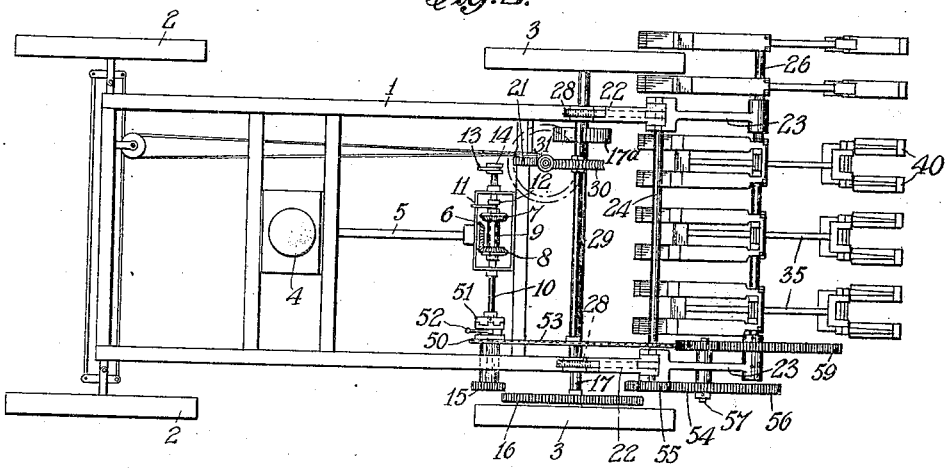
Fig. 2 is a top plan view of the same.
Figure 2A:
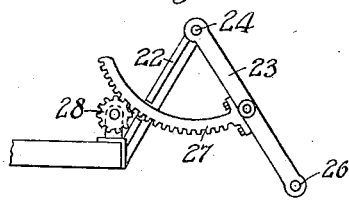

Fig. 2ᵃ is a detail of the plow elevating devices.

Fig. 3 is a detail perspective view of a pair of plow beams and plow blades illustrating the pivotal connections with the adjacent member of the rotary plow frame and the offset portions, or shoulders of the plow beams, the plow blade being shown in pendant position, and the adjacent member of the rotary plow frame in horizontal position.

Fig. 4 is a similar view showing the plow blades in vertical position, and the adjacent member of the rotary plow frame in vertical position and in engagement with the offset portions of the plow beams.

Fig. 5 is a similar view showing a single plow beam and blade and the adjacent supporting member of the rotary plow frame in the same position as indicated in Fig. 4.

Fig. 6 is an elevation of the parts illustrated in Fig. 4 from the opposite side.

Fig. 7 is a vertical sectional view on line 7—7 of Fig. 6.

Fig. 8 is a detail sectional view of one of the plow beams and blades on the line 8—8 of Fig. 6.

Fig. 9 is a similar view taken on the line 9—9 of Fig. 6.

Referring to the accompanying drawings, 1 represents the chassis or frame of the tractractor, which may be formed of any suitable material and in any desired manner, and is supported at its forward end by steering wheels, 2—2, connected to the tractor frame in any usual or desired manner so as to serve the purpose of steering the tractor, and the chassis is supported at its rear end by tractor wheels, 3—3, to which power may be applied as hereinafter described, for the purpose of propelling the tractor in either direction. 4 represents the engine or prime motor, which, as before stated, is preferably of the internal combustion type, and may be of any preferred or desired construction. It is here represented more or less diagrammatically, and it is to be understood that any suitable motor provided with the usual controlling, cooling and fuel supplying means may be employed. In this connection I have illustrated more or less diagrammatically, a system of driving gearing for operating the tractor wheels and supplying power for the rotation of the rotary plow mechanism, but I wish it to be understood that I do not limit myself to the specific form of gearing herein shown, as variations in the mechanical parts and arrangements thereof may be made without departing from the spirit of my invention.

In the drawings I have shown the motor provided with a longitudinally disposed propellor shaft, 5, provided with beveled pinion, 6, adapted to mesh with one or other of oppositely disposed beveled pinions, 7, and 8, in this instance carried on a sleeve, 9, on a counter-shaft, 10, and connected to said shaft by spline, feather or key, so that the shaft, 10, may be driven in either direction, according to the position of the sleeve, 9, which is determined by a suitable hand lever, a portion of which is indicated at 11, engaging a grooved collar, 12, on the sleeve, 9. The shaft, 10, in this instance, is movable lengthwise by means of another hand lever, a portion of which is shown at, 13, and engages a grooved collar, 14, on the shaft, and said shaft, 10, is provided with a pinion, 15, which may be moved into and out of gear with a driving gear, 16, on the shaft, 17, on which the traction wheels, 3—3, are mounted, for the purpose of imparting rotary movement to the traction wheels, 3—3, when it is desired to move the tractor from one field to another, or over the highway, and the movement of the tractor may be in either direction, according to the position of the sleeve, 9, and pinions, 7 and 8, respectively. The chassis is also provided with suitable means for enabling the operator to steer the parts by means of the front wheels, 2—2. In this instance I have shown a steering wheel, 18, mounted on the upper end of a shaft, 19, carrying a worm, 20, engaging a worm wheel, 21, see Fig. 1, connected in any suitable or desired manner, with the front wheels, 2—2, for effecting the operative movement of the steering wheels. The specific transmission mechanism and the specific steering mechanism do not form any part of my present invention, and I have therefore not particularly illustrated or described the same, as variations may be made therein, within the scope of my invention, it being only necessary that the chassis should be supplied with a motor, steering mechanism and transmission mechanism capable of being applied to the traction wheels, 3—3, for operating them in both directions. At the rear end of the chassis I provide a pair of vertical and rearwardly extending brackets, 22, to the upper ends of which are pivotally connected supporting frames, 23, extending downwardly and rearwardly from the pivotal connections, 24, and being provided at their lower ends with bearings, 25, to receive and support a shaft, 26, of the rotary plow mechanism. These supporting frames are each provided with a forwardly extending gear segment, 27, rigidly secured thereto and engaging pinions, 28, on a transverse shaft, 29, provided with a worm wheel, 30, engaged by a worm, 31, on a sleeve, 32, which in this instance surrounds the steering rod or post and is provided at its upper end with suitable means for rotating it which may be a wheel, but in this instance consists of a collar, 33, provided with radial spokes, 34, or arms, by means of which the worm can be rotated for the purpose of imparting rotary movement in either direction to the shaft, 29, and pinions, 28, engaging the segments, 27, so as to bodily raise or lower the entire rotary plow mechanism. It will be readily understood that this construction not only provides means for elevating or depressing the rotary plow mechanism with respect to the chassis of the tractor, and with respect to the surface of the ground, but also rigidly locks the plow mechanism in its adjusted positions, so that any resistance in the soil which would tend to raise the rotary plow mechanism, would be resisted by the entire weight of the rear portion of the tractor. This insures that the rotary plow mechanism will be held in proper relation with the ground at whatever depth of insertion of the plow blades the mechanism may be set for, and will insure the uniform operation of the plow mechanism at all times.

The shaft, 26, of the rotary plow mechanism is provided with a rotary frame, which in this instance consists of a plurality of radial arms, indicated at 35, each of which carries either a pair of plow blades, or a single plow blade, as may be preferred. I prefer to arrange these radial arms, 35, at intervals of about 60° around the axis of the shaft, 26, and to provide a plurality of these sets of arms arranged longitudinally of the transverse shaft, 26, as illustrated in the drawings. Each of the radial arms, 35, is provided preferably with a pair of plow blades constructed and arranged as illustrated in detail in Figs. 3, 4, 6, 7, 8 and 9, and this applies more particularly to the arms, 35, located between the supporting frames, 23. On what may be termed the furrow side of the machine, that is to say the side next to the plowed land, as distinguished from the side next to the unplowed land, I prefer to provide the shaft, 26, with two sets of radial arms, 35, adjacent to the inner and outer faces of the traction wheel, 3, in order to insure the breaking up of the soil in rear of said traction wheel and obviate the necessity of running the traction wheel on the furrow side of the machine in the previously plowed ground, which would otherwise be necessary, and these exterior sets of radial arms may be provided with single plow blades, as indicated in Fig. 5, instead of the double plow blades, if desired and found more convenient.

Figure 1:
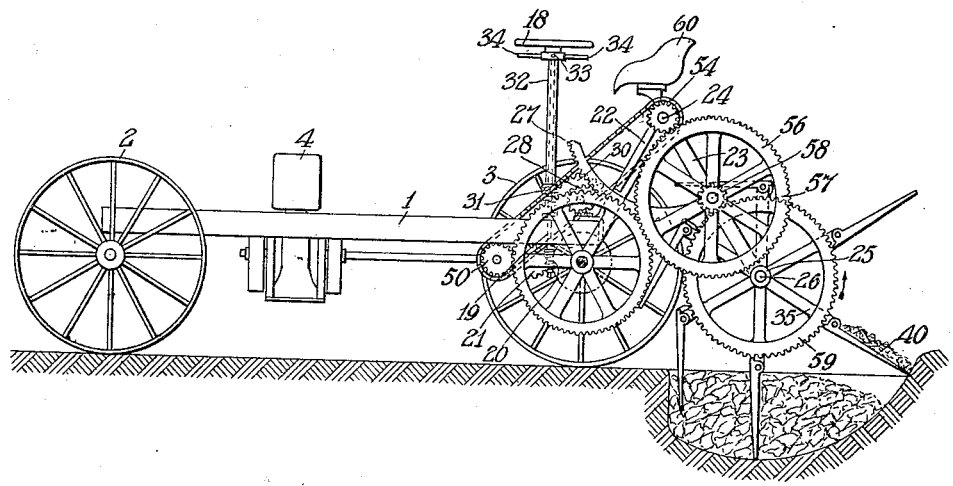
Fig. 1 represents a side elevation of one embodiment of my invention selected by me for purposes of illustration.

Referring to Figs. 3 to 9 inclusive, I will now describe the manner in which I prefer to connect the plow blades to the radial arms, 35, of the rotary plow frame. According to my preferred construction the outer end of each of the arms, 35, is provided with bifurcated portions, 36—36, having apertures therein to receive a pivot bolt, or shaft, 37, which passes through them, and through the pivot lugs, 38, carried by the plow beams, 39, to which the plow blades, 40, are connected. The pivot shaft, 37, is conveniently held in position against endwise movement in any desired manner, as for example, by set screws, 41, extending through the lugs, 38, as illustrated in Fig. 6, or in any other desired manner. Each of the plow beams, 39, is provided with a projection, or offset, portion, 42, extending on the opposite side of the lug, 38, from the blade, 40, and where the double plow construction is employed, I prefer to connect the offset portions of the plow beam by a crossbar, 43, as shown in the drawings, so that the pair of plow beams, the lugs, 38, offset portions, 42, and crossbar, 43, may be readily formed as a single forging or casting, in integral fashion, if desired, and this is my preferred construction. It will be seen by reference to the drawings, that with this construction, the plow blades and plow beams on the forward side of the rotary plow mechanism, that is to say on the side where the plow blades enter the ground, will hang vertically from their pivots (the shafts 37), so that as the rotary plow mechanism is rotated, the blades will enter the ground vertically and be driven vertically into the soil to such depth as the vertical adjustment of the rotary plow mechanism permits. As soon, however, as the radial arms, 35, assume a substantially vertical position, as indicated in Fig. 1, and in Fig. 4, for example, the offset portions, 42 and crossbar, 43, will engage the forward face of the bifurcated portion, 36, and prevent the blades from turning any further upon their shafts, 37. Each radial arm, 35, and the blades connected therewith, must thereafter move rearwardly together without flexing, as clearly illustrated in Fig. 1, thereby lifting the soil and throwing it rearwardly and laterally, as hereinafter explained, as the operation of the machine progresses. The plow blades will remain in radial position as they are carried upwardly around the rear of the rotary plow mechanism until they pass a vertical position, when they will naturally fall forward by gravity, swinging on their pivoted shafts, 7, and will be carried around and downwardly into position to be again driven vertically into the soil.

As previously stated, the plow blades, 40, are disposed angularly to a line extending transversely of the machine, as indicated in Fig. 8. The main body of the blade, 40, may be formed integrally with the plow beam, 39, or separately therefrom, and riveted thereto, as indicated in Fig. 8. In order to avoid the necessity of replacing the entire double blade construction when the lower edges of the plow blades have become worn, I prefer to provide each of the plow blades with a cutting edge portion, indicated at 44, formed separately therefrom and secured thereto by means of rivets, so that when the cutting edges of the blades become dull or broken they may be removed and replaced. To facilitate this replacement of the cutting edges, the lower ends of the blades, 40, proper, are preferably beveled and the upper edges of the separate cutting portions are correspondingly beveled, so as to give an extended bearing between the meeting faces of these parts and enable the rivits, indicated at 45, (or bolts) to hold them firmly in position.

In order to protect the pivotal connections of the plow beams and the radial arms from dirt and also to prevent the collection of dirt between the offset portions, 42, and the crossbar, 43, and the bifurcated portions, 36, of the radial arm, I prefer to provide shields for these pivotal connections, as illustrated in Figs. 5 to 7 inclusive. For this purpose each of the offset portions, 42, is provided with a lug, 46, to receive a pivot shaft, 47, on which is pivotally mounted a guard or shield, 48, the free edge of which bears against the radial arm, 35, as indicated in the drawings, and is held in engagement therewith by a light spiral spring, 49, surrounding the shaft, 47. These guards or guides are capable of movement as the radial arms, 35, are rotated and will serve the purpose of deflecting any dirt or débris which may be carried over by the plow blades from interfering with the proper operation of the pivotal connections between the blades and said radial arms and of the offset portions of the plow beams before referred to.

In Fig. 5 I have shown a single plow blade, 40ª, provided with a plow beam, 39ª, having lugs, 38ª, connected by a pivoted bolt, 37ª, with the bifurcated portion 36ª, of a radial arm, 35ª, in a manner entirely similar to that illustrated in Figs. 3 and 4, except that the plow beam is provided with an integral offset portion, 42ª, to engage the face of the bifurcated portion, 36ª, when the blade is brought into substantial alignment with the radial arm, 35ª. The pivotal connection is also shown protected by the pivotally mounted shield, 48ª, constructed and operating substantially as before described.

When the apparatus is to be used for plowing, the driving mechanism between the motor and traction wheels is disconnected, as by shifting the shaft, 10, into the position shown in Fig. 2, in which the pinion, 15, is out of engagement with the gear wheel, 16, and rotary motion is imparted to the rotary plow construction just described, to effect the plowing of the soil, and also to simultaneously effect the forward movement of the machine over the ground as the plowing proceeds. The rotary plow mechanism is rotated at very slow speed, and in the present drawings I have illustrated the following mechanism for imparting the necessary motion thereto. In this instance the shaft, 10, is shown provided with a sprocket wheel, 50, loosely mounted thereon and provided with a suitable clutch mechanism, indicated at 51, and clutch lever, indicated at 52, for connecting the sprocket wheel, 50, with the shaft, 10, when it is desired to operate the plow. The sprocket wheel, 50, engages a chain, 53, which passes around a sprocket wheel, 54, on one of the shafts, 24, on which the swinging plow supporting frame is mounted. This sprocket wheel imparts motion to a pinion, 55, which engages a large gear wheel, 56, on an intermediate shaft, 57, provided with a pinion, 58, engaging a large gear wheel, 59, on the shaft, 26, of the rotary plow mechanism, thus imparting very slow motion to the rotary plow mechanism. It will be understood that in the operation of the machine in plowing, each plow blade, as it nears the surface of the ground, will be in vertical position, and will be forced by the revolution of the rotary plow mechanism downwardly and vertically into the soil. As the blade takes hold of the soil the continued revolution of the plow mechanism will cause the tractor carrying the entire mechanism to move forward with respect to the surface of the ground. The effect of driving the blade into the ground will be to separate the portion of the soil in rear of the blade from the more solid portions in front of it. As this movement progresses the angle between the radial arm to which the blade is connected and the vertical blade will gradually change as the radial arm approaches a vertical position. After this point is reached the offset portions of the plow beams engage the bifurcated portions of the radial arm and prevent any further change of position of the blade with respect to the radial arm with which it is connected. It will be understood that by this time other blades have entered the soil forward of the radially disposed blades, and that therefore, as the forward movement of the machine over the ground continues, the radially disposed blades will lift the soil in rear of them and throw it backward and laterally (on account of the angular position which the blades occupy with respect to a line extending transversely of the machine) so that each blade is driven into the soil and caused thereafter to lift the soil and throw it laterally in substantially the same manner that would occur with a spade or shovel wielded by hand. On account of the large number of blades employed, the amount of soil broken away, lifted and thrown rearwardly and laterally by each blade, is relatively small and easily within the power of the operative mechanism, and the soil is thus not only plowed up, but more perfectly broken up and pulverized than where a large single furrow is turned up by the ordinary plow-share and the subsequent pulverizing by harrowing of the ground is greatly facilitated, and in some instances may be entirely dispensed with. During the plowing operation, the operator, who may be supported by a seat, 60, adjacent to the steering wheel and elevating apparatus, will be enabled to guide the forward movement of the machine by the steering wheel, 18. The rotary plow mechanism will be adjusted to cause the blades to enter the soil to the desired depth, and the plowing will be carried on uniformly to that depth, as it will be readily seen that the elevating mechanism is practically locked in all its adjusted positions by the engagement of the worm, 31, and worm wheel, 30, and that the plowing mechanism is held rigidly to its work. Any resistance to the plowing mechanism will be transferred to and be resisted by the entire weight of the plow mechanism itself, and the entire rear portion of the tractor. Of course, if it should be necessary to elevate the plowing mechanism to pass an obstruction, like a rock embedded in the soil, etc., the operator can readily elevate the rotary plowing mechanism to the desired extent and quickly return it to its desired position, by means of the rotary arms, 34, on the sleeve, 32, carrying the worm, 31.

After a field is plowed, if it is desired to move the machine to another field, the worm, 31, may be rotated so as to elevate the plow mechanism above the level of the ground, and the motor may be placed in engagement with the traction wheels, so as to drive the mechanism over the ground, as is usual in ordinary traction purposes. The apparatus may also be used in this manner for hauling, and other purposes for which a tractor is employed.

What I claim and desire to secure by Letters Patent is:—

1. In a rotary plow mechanism, the combination with a rotary supporting part, a plurality of radial arms secured thereto, and provided at their outer ends with bifurcated portions provided with pivots, plow beams carried by said arms and provided with pivot lugs engaging said pivots, stops for preventing said plow beams from swinging in one direction on said pivots beyond a substantially radial position, plow blades carried by said plow beams, each of said blades being disposed at a similar angle to a line extending transversely with respect to the machine, for throwing the soil rearwardly and laterally from each of said blades.

2. A rotary plow mechanism comprising among its members a rotary plow supporting means, a plurality of plow blades loosely pivoted thereto at separated points arranged in a circle around the axis of rotation of said rotary plow supporting means, means for preventing the backward movement of each blade with respect to the direction of rotary movement of said rotary plow supporting means beyond a substantially radial position, and a shield supported adjacent to each of said pivotal connections to protect the same.

3. A rotary plow mechanism comprising among its members a rotary plow supporting means, a plurality of plow blades loosely pivoted thereto at separated points arranged in a circle around the axis of rotation of said rotary plow supporting means, means for preventing the backward movement of each blade with respect to the direction of rotary movement of said rotary plow supporting means beyond a substantially radial position, and a shield pivotally connected to each of said blades and adapted to extend over the adjacent pivotal connection thereof, to protect the same.

4. A rotary plow mechanism comprising among its members a rotary plow supporting means, a plurality of plow blades loosely pivoted thereto at separated points arranged in a circle around the axis of rotation of said rotary plow supporting means, means for preventing the backward movement of each blade with respect to the direction of rotary movement of said rotary plow supporting means beyond a substantially radial position, a shield pivotally connected to each of said blades adjacent to its said pivotal connection and provided with an actuating spring for holding it yieldingly in position to protect said pivotal connection.

5. In a rotary plow mechanism, the combination of a rotary shaft, a plurality of radial arms connected therewith, a plow blade loosely pivoted to each of said arms and provided with an offset portion extending on the opposite side of the axis of said pivotal connection from the blade for engaging said arm and preventing the backward movement of the blade on its pivotal connection with respect to the direction of rotary movement beyond a substantially radial position, and a pivotally mounted spring actuated shield adjacent to each of said pivotal connections for protecting said pivotal connections and offset portions.

6. In a rotary plow mechanism, the combination of a rotary shaft, a plurality of radial arms connected therewith, a plow blade loosely pivoted to each of said arms and provided with an offset portion extending on the opposite side of the axis of said pivotal connection from the blade for engaging said arm and preventing the backward movement of the blade on its pivotal connection with respect to the direction of rotary movement beyond a substantially radial position, a pivotally mounted shield carried by the offset portions of each of said blades, and a spring for holding said shield in yielding engagement with the adjacent radial arm to protect the pivotal connection and offset portion.

7. In a rotary plow mechanism, the combination of a rotary shaft, a plurality of radial arms carried by said shaft, each provided at its outer end with a bifurcated portion, plow beams provided with pivot lugs, pivoted shafts loosely pivoting said lugs to the bifurcated portions of said arms, plow blades carried by said plow beams and disposed angularly to a line extending transversely of the mechanism, said plow beams having offset portions extending on the opposite side of the adjacent pivot shaft from the blades for engaging portions of the adjacent radial arm for preventing the backward movement of said blades upon their pivot shafts with respect to the direction of rotary movement of the radial arms, beyond a substantially radial position.

8. In a rotary plow mechanism, the combination of a rotary shaft carried by said frame, a plurality of radial arms carried by said shaft, each provided at its outer end with a bifurcated portion, plow beams provided with pivot lugs, pivoted shafts loosely pivoting said lugs to the bifurcated portions of said arms, plow blades carried by said plow beams and disposed angularly to a line extending transversely of the mechanism, said plow beams having offset portions extending on the opposite side of the adjacent pivot shaft from the blades for engaging portions of the adjacent radial arm for preventing the backward movement of said blades upon their pivot shafts with respect to the direction of rotary movement of the radial arms, beyond a substantially radial position, said offset portions being provided with pivotally mounted spring actuated shields carried thereby, and held in yielding engagement with the adjacent radial arms for protecting the pivotal joints and offset portions of each blade.

In testimony whereof I affix my signature.

MICHAEL DE CRISTOFARO.